United States Patent [19]
Katakura et al.

[11] Patent Number: 6,049,752
[45] Date of Patent: Apr. 11, 2000

[54] AUTOMATIC TRANSMISSION LOCKUP CONTROL APPARATUS

[75] Inventors: Shusaku Katakura, Kanagawa; Hisaaki Toujima, Yokohama, both of Japan

[73] Assignee: Nissan Motor Co., Ltd., Yokohama, Japan

[21] Appl. No.: 08/841,258

[22] Filed: Apr. 30, 1997

[30] Foreign Application Priority Data

Apr. 30, 1996 [JP] Japan .................................. 8-109331

[51] Int. Cl.⁷ .................................................. F16H 61/14
[52] U.S. Cl. .............................. 701/68; 701/58; 477/169
[58] Field of Search ............................... 701/58, 67, 68; 477/169, 176

[56] References Cited

U.S. PATENT DOCUMENTS

| | | | |
|---|---|---|---|
| 5,115,897 | 5/1992 | Yoshimura et al. | 192/52 |
| 5,325,946 | 7/1994 | Kashiwabara et al. | 192/3.31 |
| 5,520,594 | 5/1996 | Fukasawa et al. | 477/173 |
| 5,547,438 | 8/1996 | Nozaki et al. | 477/169 |
| 5,588,937 | 12/1996 | Kono et al. | 477/169 |
| 5,616,099 | 4/1997 | Sakai | 477/169 |
| 5,649,881 | 7/1997 | Iizuka | 477/169 |
| 5,667,458 | 9/1997 | Narita et al. | 477/169 |

FOREIGN PATENT DOCUMENTS

| | | |
|---|---|---|
| 4-290674 | 10/1992 | Japan . |
| 5-141526 | 6/1993 | Japan . |

*Primary Examiner*—Michael J. Zanelli
*Attorney, Agent, or Firm*—Foley & Lardner

[57] ABSTRACT

A lockup control apparatus for use with an automotive vehicle including an engine, an automatic transmission and a torque converter having a lockup clutch operable on a variable engagement force to provide a controlled degree of mechanical connection between the engine and the automatic transmission during deceleration. The lockup engagement force is set at a target value substantially equal to a first value calculated based on vehicle operating conditions plus a second value calculated based on engine output at a first stage of lockup control operation when the engine output remains positive after the driver's operation is detected and it is decreased at a predetermined rate to the first value at a second stage of lockup control operation after the engine output becomes negative.

16 Claims, 9 Drawing Sheets

AUTOMATIC TRANSMISSION LOCKUP CONTROL APPARATUS

BACKGROUND OF THE INVENTION

This invention relates to a lockup control apparatus for use with an automotive vehicle having an engine, an automatic transmission and a torque converter having a lockup clutch operable on a variable engagement force to provide a controlled degree of mechanical connection between the engine and the automatic transmission.

Various techniques for automatic transmission lockup control have been proposed. Assuming now that the target lockup engagement force value is decreased rapidly in a stepped fashion to its minimum value required during deceleration, as shown in FIG. 9A, to reduce the lockup engagement force, as shown in FIG. 9B, the response is improved when the lockup condition is released after the lockup engagement force reduction because of decreased deformation of the lockup clutch and the torque converter cover. In this case, the degree of reduction of the engine speed decreases as the lockup engagement force decreases. For this reason, it is possible to release the lockup condition at a sufficient response rate by controlling the lockup engagement force to its minimum value during deceleration. Therefore, the engine can be prevented from stalling in the presence of sudden braking (at time t1) upon a change in a lockup condition from an acceleration condition to a deceleration condition. When the lockup engagement force is decreased just after the throttle valve becomes OFF (the accelerator pedal is released), however, the lockup engagement force decreases at a greater rate than the engine output. As a result, the lockup engagement force becomes so insufficient as to cause slip rotation, as indicated by the broken curve of FIG. 9C, to obstruct smooth output shaft torque reduction.

The reason for the delay of the engine output reduction with respect to the lockup engagement force reduction is as follows: It is the current practice to delay the termination of delivery of fuel to the engine or correct the intake air flow rate so as to prevent a rapid drop in the engine output (rapid engine output drop preventive control) just after the throttle valve becomes OFF, as indicative by the broken curve of FIG. 9D, in order to avoid vibrations and a sense of rapid deceleration to the driver which may be caused a rapid engine output drop, as indicated by the solid curve of FIG. 9B, when the throttle position decreases at a rapid rate, as indicated by the solid curve of FIG. 9D. Thus, the lockup engagement force cannot be decreased at a rapid rate during the rapid engine output drop preventive control without providing a sense of incompatibility to the driver. If the brake pedal is depressed immediately after the condition that the throttle valve is in its OFF position in a short time during the rapid engine output drop preventive control, the engine would stall. Furthermore, if the lockup engagement force is decreased at a rapid rate, the lockup control fluid pressure will overshoot to cause slip rotation or failure to achieve lockup engagement during deceleration in spite of the fact that a target lockup engagement force value sufficient to hold the lockup engagement condition is commanded.

SUMMARY OF THE INVENTION

It is a main object of the invention to provide an improved lockup control apparatus which can prevent the engine from stalling upon a change from a normal lockup control to a lockup engagement force control during deceleration.

There is provided, in accordance with the invention, a lockup control apparatus for use with an automotive vehicle including an engine, an automatic transmission and a torque converter having a lockup clutch operable on a variable engagement force to provide a controlled degree of mechanical connection between the engine and the automatic transmission during deceleration. The lockup control apparatus comprises means for sensing vehicle operating conditions including engine output, means for detecting a driver's operation to change one of acceleration and steady conditions to a deceleration condition, and control means for controlling the engagement force applied to the lockup clutch. The control means includes means for calculating a first value based on the sensed vehicle operating conditions, means for calculating a second value based on the sensed engine output, means for setting the lockup engagement force at a value substantially equal to the first value plus second value at a first stage of lockup control operation when the engine output remains positive after the driver's operation is detected, and means for decreasing the lockup engagement force at a predetermined rate to the first value at a second stage of lockup control operation after the engine output becomes negative.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
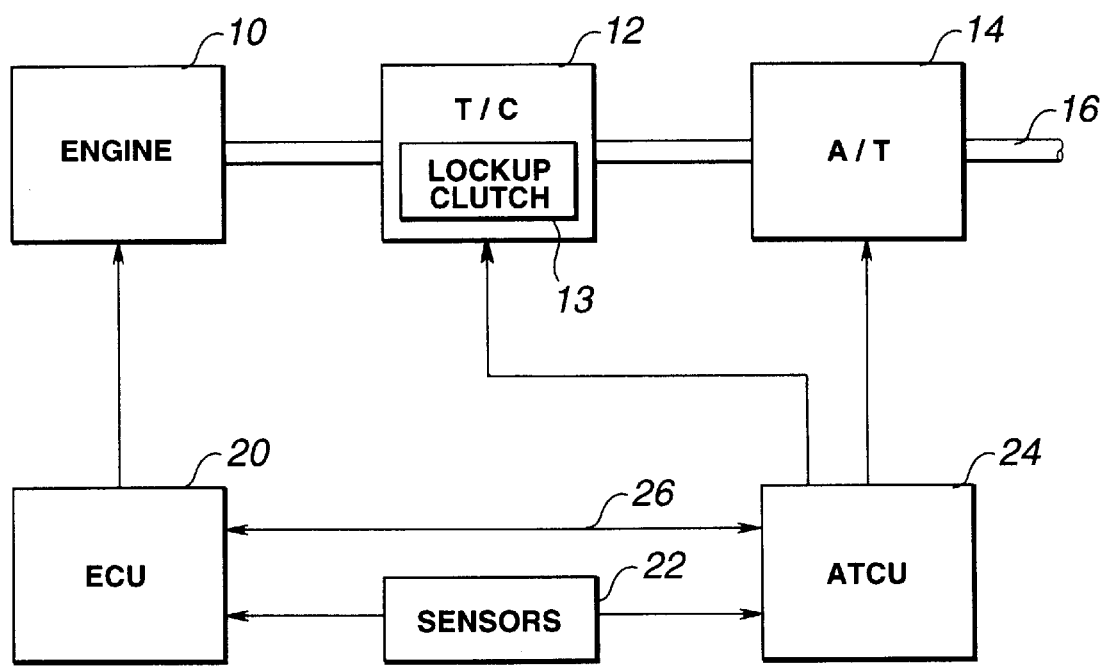
FIG. 1 is a schematic block diagram showing one embodiment of a lockup control apparatus made in accordance with the invention.

With reference to the drawings and in particular to FIG. 1, there is shown a schematic block diagram of a lockup control apparatus embodying the invention. The lockup control apparatus is used with an automotive vehicle having an engine 10 from which a drive is transmitted through a torque converter (T/C) 12 to an automatic transmission (A/T) 14. The torque converter 12 has a lockup clutch 13. An engine control unit 20 is provided to control the engine 10 based on various engine operating conditions that are sensed during the operation of the engine 10. For this purpose, various sensors 22 are connected to the engine control unit 20. The automatic transmission 14 has various friction elements, such as clutches, brakes and servos, selectively engaged and released, according to a shift schedule, to selectively establish a desired transmission gear ratio at which the drive is outputted to an output shaft 16. The transmission gear ratio control is made on command from an automatic transmission control unit (ATCU) 24. The automatic transmission control unit 24 also produces a lockup command signal having a desired duty ratio (DUTY) to operate the lockup clutch 13 so as to place the torque converter 12 in a lockup mode L/U where a mechanical connection is completed between the engine 10 and the automatic transmission 14 or in a converter mode T/C where a hydrodynamic driving connection exists between the engine 10 and the automatic transmission 14. For example, the lockup clutch 13 is opened, unlocked, released or disengaged to operate the torque converter 12 in the converter mode when the duty ratio of the lockup command signal is 0% and it is closed, locked, applied or engaged to operate the torque converter 12 in the lockup mode when the duty ratio of the lockup command signal is 100%. It is also possible to control the lockup clutch 13 to have a desired lockup capacity by adjusting the duty ratio of the lockup command signal.

The operation of the automatic transmission control unit 24 is made based on various conditions including engine throttle position TV0, engine output shaft speed Ne, torque converter output shaft speed Ni and transmission output shaft speed No. Thus, an engine throttle position sensor, an engine output shaft speed sensor and a transmission output shaft speed sensor are connected to the automatic transmission control unit 24. The engine throttle position sensor is associated with the engine throttle valve and it produces a voltage signal proportional to the degree TV0 of rotation of the engine throttle valve. The engine output shaft speed sensor is associated with the engine distributor and it produces a pulse signal of a repetitive rate proportional to the engine output shaft speed Ne. The transmission output shaft speed sensor is located at a position for sensing the speed No of rotation of the transmission output shaft. The automatic transmission control unit 24 communicates through a communication channel with the engine control unit 20 for synchronizing signal communication.

The automatic transmission control unit 24 may employs a digital computer which includes a central processing unit (CPU), a random access memory (RAM), a read only memory (ROM) and an input/output control unit (I/O). The central processing unit communicates with the rest of the computer via data bus. The read only memory contains the programs for operating the central processing unit and further appropriate data, for example, shift schedules and lockup schedules, in look-up tables used for gear-shift and lockup control.

Figure 2:
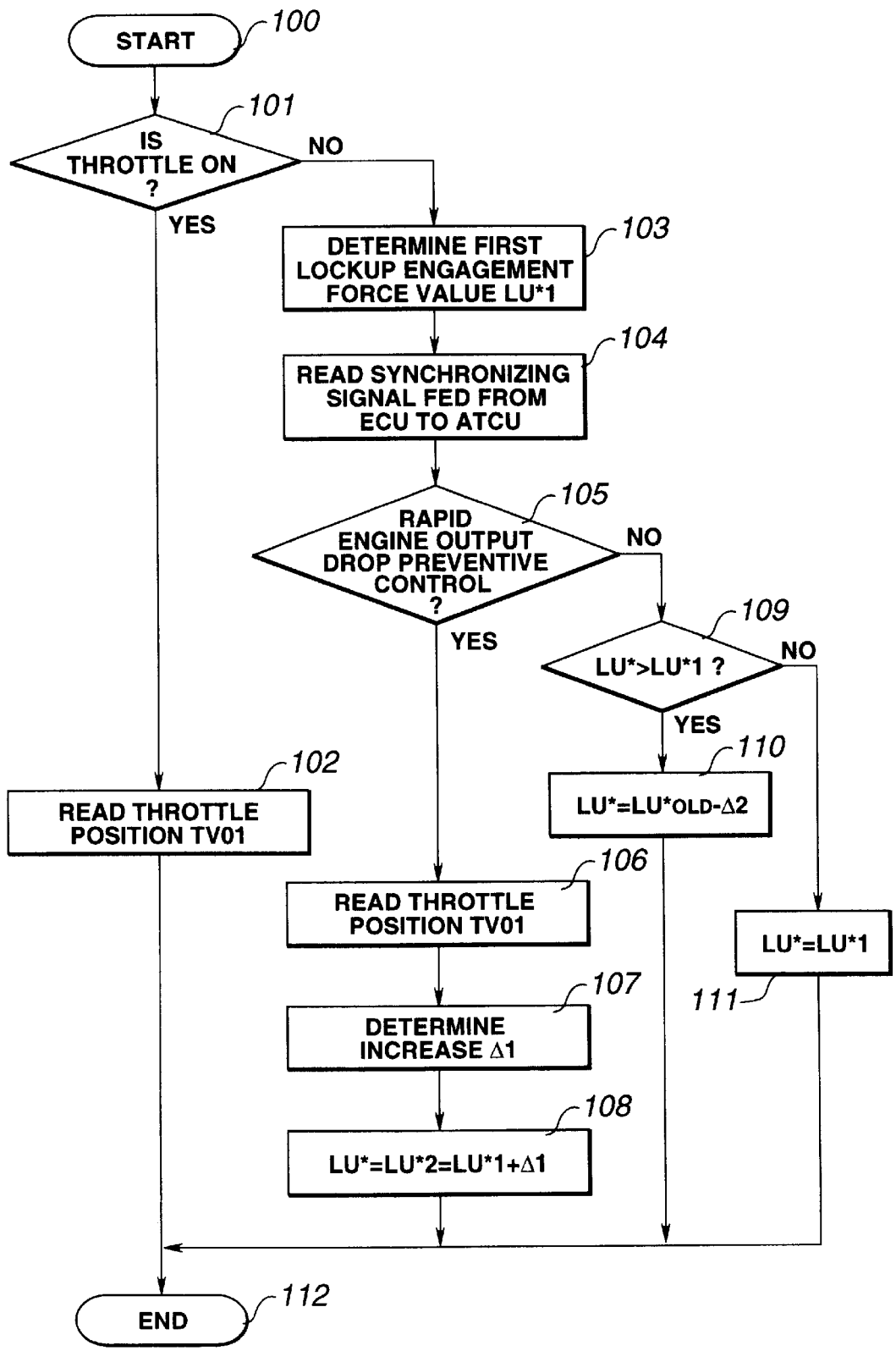
FIG. 2 is a flow diagram illustrating the programming of the digital computer as it is used for lockup control.

FIG. 2 is a flow diagram illustrating the programming of the digital computer as it is used for lockup control. The computer program is entered at the point 100. At the point 101 in the program, a determination is made as to whether or not the engine throttle valve is ON (open). This determination is made based on the signal fed from the throttle position sensor. If the answer to this question is "yes", then the vehicle is accelerated and the program proceeds to the point 102 where the sensed value TV01 of the throttle position TV01 is used to update the last value stored in the computer memory. Consequently, the throttle position value TV01 sensed just before the throttle valve is closed is held in the computer memory. Following this, the program proceeds to the end point 112. While the answer to the question at the point 101 remains "yes", that is, during vehicle acceleration or steady condition, the last target value for the lockup engagement force under which the lockup clutch 13 is to be engaged is used so as to hold the lockup clutch 13 engaged.

If the throttle valve is OFF (closed), then it means that the vehicle is decelerated and the program proceeds from the point 101 to the point 103 where a first target value LU*1 for the lockup engagement force under which the lockup clutch 13 is to be engaged is calculated based on vehicle speed, engine speed and accessory operating conditions. At the point 104, the synchronizing signal transmitted from the engine control unit 20 to the automatic transmission control unit 24 is read. The read synchronizing signal is used to detect the length of time during which a rapid engine output drop preventive control is performed. At the point 105, a determination is made as to whether or not the rapid engine output drop preventive control is performed. If the answer to this question is "yes", then the program proceeds to the point 106. Otherwise, the program proceeds to the point 109.

At the point 106 in the program, the throttle position TV01 stored at the point 102 is read from the computer memory. At the point 107, a value Δ1 by which the target engagement force value increases is calculated based on the read throttle position TV01. At the point 108, a new target engagement force value LU* is calculated as LU*=LU*2= LU*1+Δ1. The calculated target engagement force value LU* is outputted for lockup engagement force control. Following this, the program proceeds to the end point 112.

If the rapid engine output drop preventive control is interrupted, then the program proceeds from the point 105 to another determination step at the point 109. This determination is as to whether or not the last target lockup engagement force value LU* is greater than the first target lockup engagement force value LU*1 calculated at the point 103. The answer to this question is "yes" just after the rapid engine output drop preventive control is terminated and the program proceeds to the point 110 where a new target engagement force value LU* is calculated as LU*= LU*$_{OLD}$–Δ2 where LU*$_{OLD}$ is the last target lockup engagement force value and Δ2 is the value by which the target lockup engagement force decreases. It is to be noted that the time differentiation of the decrease Δ2 corresponds to a predetermined decreasing rate capable of preventing the lockup control fluid pressure from overshooting. The calculated target engagement force value LU* is outputted for lockup engagement force control. Following this, the program proceeds to the end point 112. The target lockup engagement force value is decreased repetitively at the point 110 so that the target lockup engagement force value LU* decreases at a predetermined rate capable of preventing the lockup control fluid pressure from overshooting until the last target lockup engagement force value LU* decreases below the first target lockup engagement force value LU*1. When the target lockup engagement force value decreases from the second value LU*2 to the first value LU*1, the program proceeds from the point 109 to the point 111 where the target lockup engagement force value LU* is calculated as LU*= LU*1. The calculated target engagement force value LU* is outputted for lockup engagement force control. Following this, the program proceeds to the end point 112.

The operation will be described further with reference to FIGS. 3 and 4. Assuming now that the driver releases the accelerator pedal to change the engine throttle valve from its ON position to its OFF position at time t1 (FIG. 3), a change from an accelerating or steady condition with the lockup clutch 13 being engaged to a decelerating condition is detected. As a result, a first target lockup engagement force value LU*1 is calculated at the point 102 of FIG. 2. Since the rapid engine output drop preventive control is initiated at time t1, the lockup engagement force is set at the second target lockup engagement force value LU*2, which is equal to the first target lockup engagement force plus an increase Δ1, at the point 108 of FIG. 2.

Figure 3:
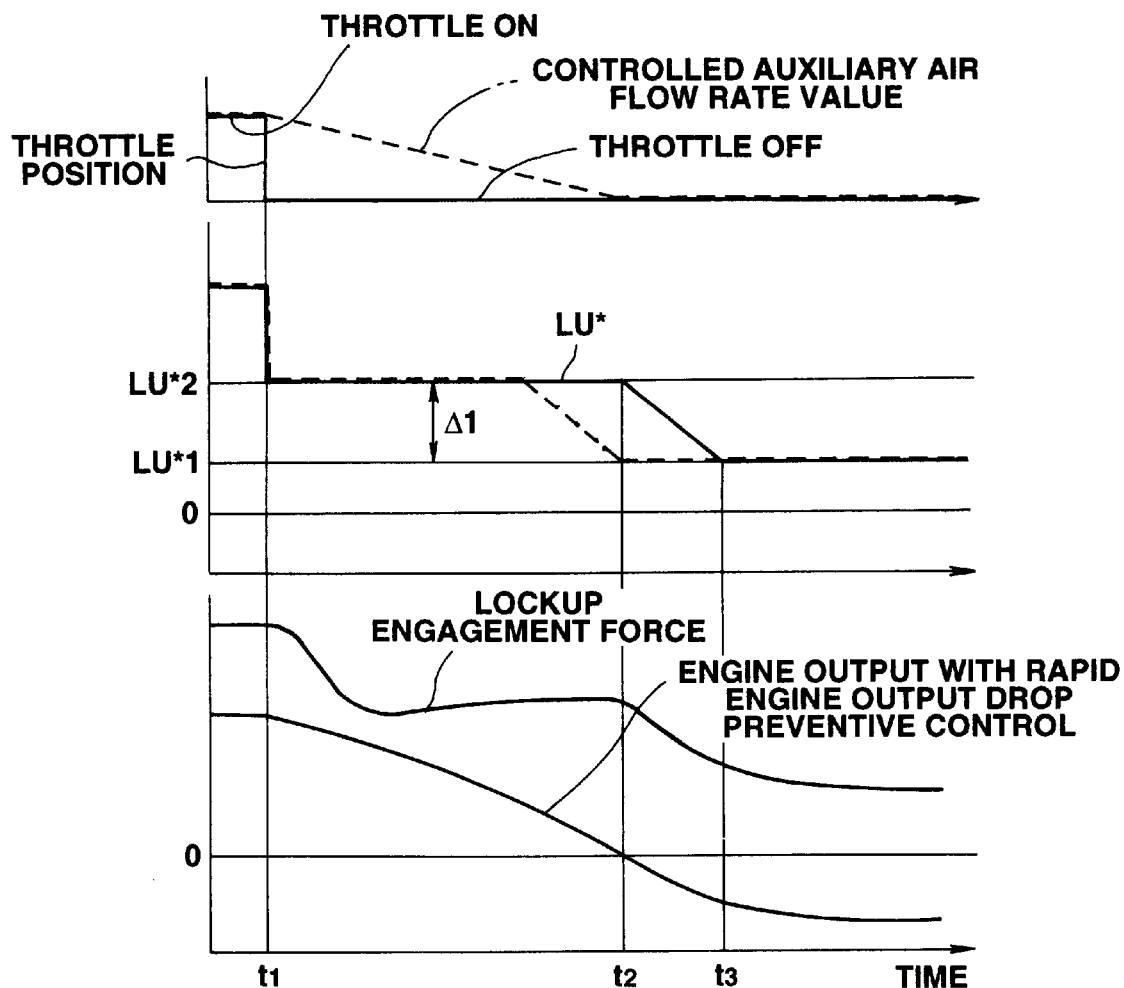
FIG. 3 is a graph used in explaining the operation of the lockup control apparatus of the invention.
Figure 4:
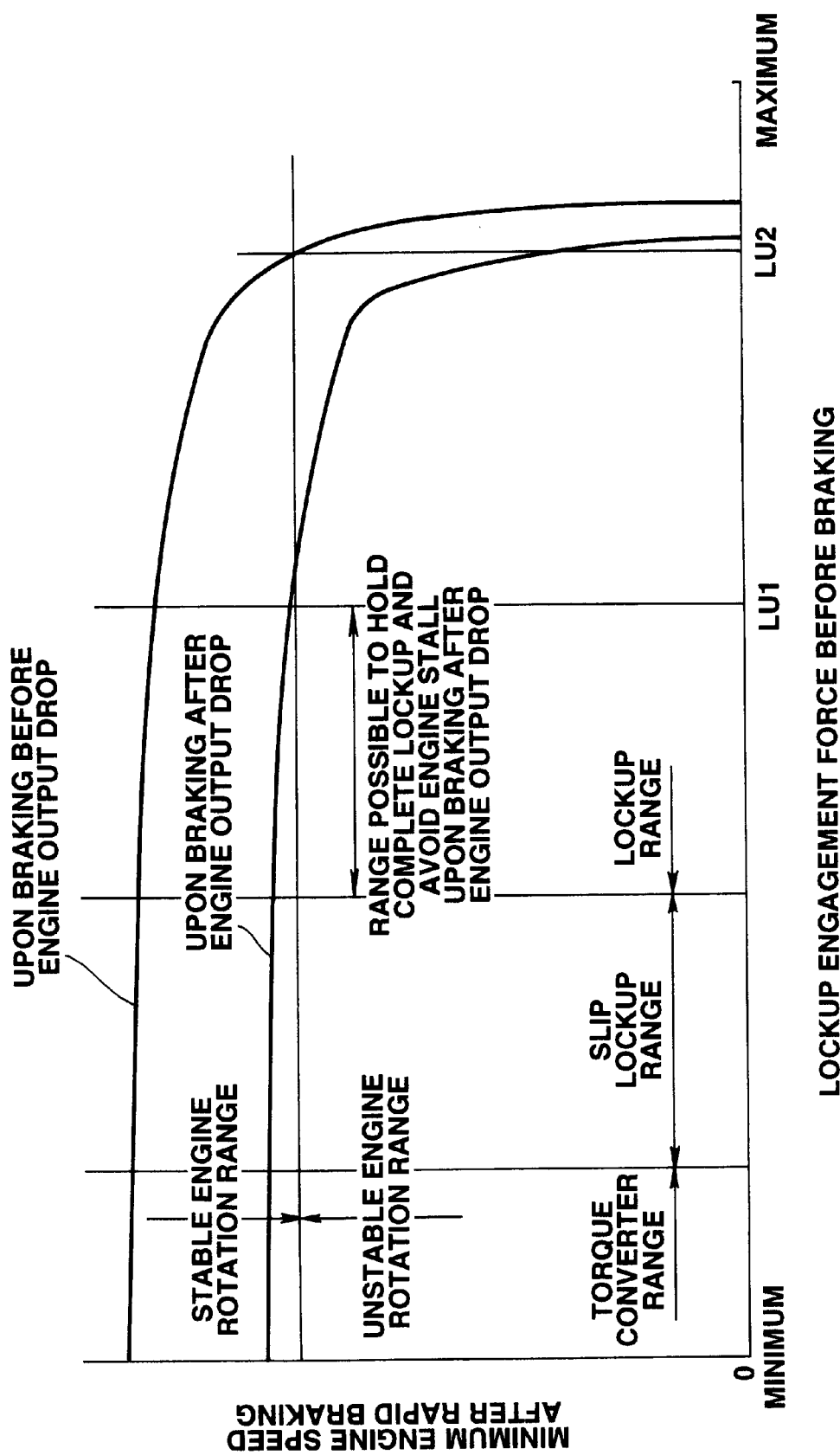
FIG. 4 is a graph used in explaining the operation of the lockup control apparatus of the invention.

Just after the engine throttle valve changes from its ON position to its OFF position, the engine output is positive with the rapid engine output drop preventive control, as shown in FIG. 3. For this reason, the possibility of the engine stalling is much less in this case than in the case where the engine output becomes negative after the rapid engine output drop preventive control is terminated. That is, when the engine output is negative upon braking after an engine output decrease, the minimum engine speed after the rapid braking changes from a stable engine rotation range to an unstable engine rotation range with the lockup engagement force before braking exceeding the first target lockup engagement force value LU*1, as shown in FIG. 4. For this reason, it is impossible to provide a lockup engagement force greater than the first target lockup engagement force value UL*1 when the engine output is negative. When the engine output is positive upon braking before an engine output decrease, however, the minimum engine speed after rapid braking remains in the stable engine rotation range until the lockup engagement force before braking reaches the second target lockup engagement force value LU*2 which is much greater than the first target lockup engagement force value LU*1. For this reason, the engine can hardly stall even with a greater lockup engagement force upon braking before an engine output decrease.

The invention utilizes this fact. According to the invention, the lockup engagement force is decreased to a second target value LU*2 greater than a first target value LU*1 during the interval between the times t1 and t2 (FIG. 3). The second target lockup engagement force value LU*2 is selected to avoid both engine stall and engine racing. During the interval between the times t2 and t3 (FIG. 3), the lockup engagement force is decreased smoothly from the second target value LU*2 to the first target value LU*1 at such a rate as to avoid undershooting according to the engine output decrease. After the time t3, the lockup engagement force is set at the first target value LU*1. The first target value LU*1 is selected for use in the normal lockup control. Thus, the lockup engagement force changes in such a manner as shown in FIG. 3. It is, therefore, possible to avoid engine stall even with rapid braking upon a change in a lockup condition from an acceleration condition to a deceleration condition. In the absence of rapid braking, it is possible to make a change to the lockup engagement force drop control during deceleration without racing. Since the lockup engagement force is decreased to an intermediate value (second target value LU*2) and then to the first target value LU*1, it is possible to prevent the lockup control fluid pressure from overshooting.

Figure 5:
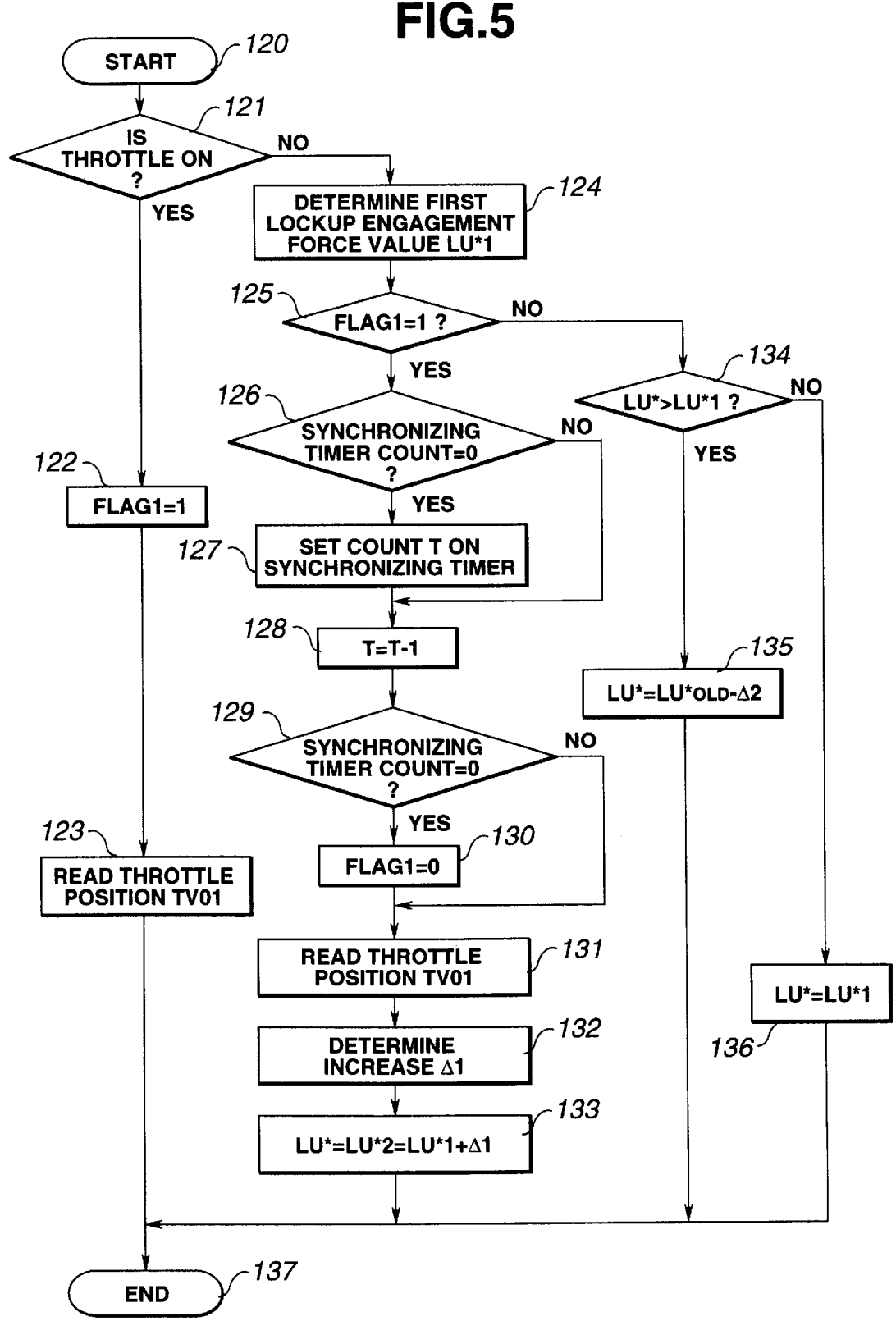
FIG. 5 is a flow diagram illustrating a modified form of the programming of the digital computer as it is used for lockup control.

FIG. 5 is a flow diagram illustrating a modified form of the programming of the digital computer as it is used for lockup control. In this embodiment, the period of time during which the rapid engine output drop preventive control is performed is determined based on engine operating conditions and predetermined engine information. The computer program is entered at the point 120. At the point 121 in the program, a determination is made as to whether or not the engine throttle valve is ON (open). This determination is made based on the signal fed from the throttle position sensor. If the answer to this question is "yes", then the vehicle is accelerated and the program proceeds to the point 122 where a flag is set at 1 to indicate a change of the throttle valve from its ON position to its OFF position and then to the point 123 where the sensed value TV01 of the throttle position TV01 is used to update the last value stored in the computer memory. Consequently, the throttle position value TV01 sensed just before the throttle valve is closed is held in the computer memory. Following this, the program proceeds to the end point 137. While the answer to the question at the point 121 remains "yes", that is, during vehicle acceleration or steady condition, the last target value for the lockup engagement force under which the lockup clutch 13 is to be engaged is used so as to hold the lockup clutch 13 engaged.

If the throttle valve is OFF (closed), then it means that the vehicle is decelerated and the program proceeds from the point 121 to the point 124 where a first target value LU*1 for the lockup engagement force under which the lockup clutch 13 is to be engaged is calculated based on vehicle speed, engine speed and accessory operating conditions. At the point 125, a determination is made as to whether or not the flag has been set. If the answer to this question is "yes", then it means that the driver operates to make a change from an acceleration or steady condition to a deceleration condition and the program proceeds to the point 126. Otherwise, the program proceeds to the point 136. At the point 126, a determination is made as to whether or not the count accumulated by a synchronizing timer is zero. If the answer to this question is "yes", then the program proceeds to the point 127 where a count T is set on the synchronizing timer. The count T corresponds to the time at which the lockup engagement force reduction is initiated in synchronism with the rapid engine output drop preventive control and it is calculated based on vehicle speed, engine speed, throttle position TV01, engine coolant temperature, ATF oil temperature and the like. Otherwise, the program jump the point 127 to the point 128.

At the point 128 in the program, a command is produce to cause the synchronizing counter to count down by one step. At the point 129, a determination is made as to whether or not the count T of the synchronizing counter is zero. If the answer to this question is "yes", then the program proceeds to the point 130 where the flag is cleared to zero. Otherwise, the program jumps the point 129 to the point 131.

At the point 131 in the program, the throttle position TV01 stored at the point 123 is read from the computer memory. At the point 132, a value Δ1 by which the target engagement force value increases is calculated based on the read throttle position TV01. At the point 133, a new target engagement force value LU* is calculated as LU*=LU*2= LU*1+Δ1. The calculated target engagement force value LU* is outputted for lockup engagement force control. Following this, the program proceeds to the end point 137.

At the point 136 in the program, a determination is made as to whether or not the last target lockup engagement force value LU* is greater than the first target lockup engagement force value LU*1 calculated at the point 124. The answer to this question is "yes" just after the rapid engine output drop preventive control is terminated and the program proceeds to the point 135 where a hew target engagement force value LU* is calculated as LU*=LU*$_{OLD}$−Δ2 where LU*$_{OLD}$ is the last target lockup engagement force value and Δ2 is the value by which the target lockup engagement force decreases. It is to be noted that the time differentiation of the decrease Δ2 corresponds to a predetermined decreasing rate capable of preventing the lockup control fluid pressure from overshooting. The calculated target engagement force value LU* is outputted for lockup engagement force control.

Following this, the program proceeds to the end point 137. The target lockup engagement force value is decreased repetitively at the point 135 so that the target lockup engagement force value LU* decreases at a predetermined rate capable of preventing the lockup control fluid pressure from overshooting until the last target lockup engagement force value LU* decreases below the first target lockup engagement force value LU*1. When the target lockup engagement force value decreases from the second value LU*2 to the first value LU*1, the program proceeds from the point 134 to the point 136 where the target lockup engagement force value LU* is calculated as LU*=LU*1. The calculated target engagement force value LU* is outputted for lockup engagement force control. Following this, the program proceeds to the end point 137.

In this embodiment, the engine output becomes negative in interval between the times t2 and t3 during which the target lockup engagement force value LU* is decreased from the second value LU*2 to the first value LU*1. However, it is preferable to maintain the engine output positive in this interval.

Figure 6:
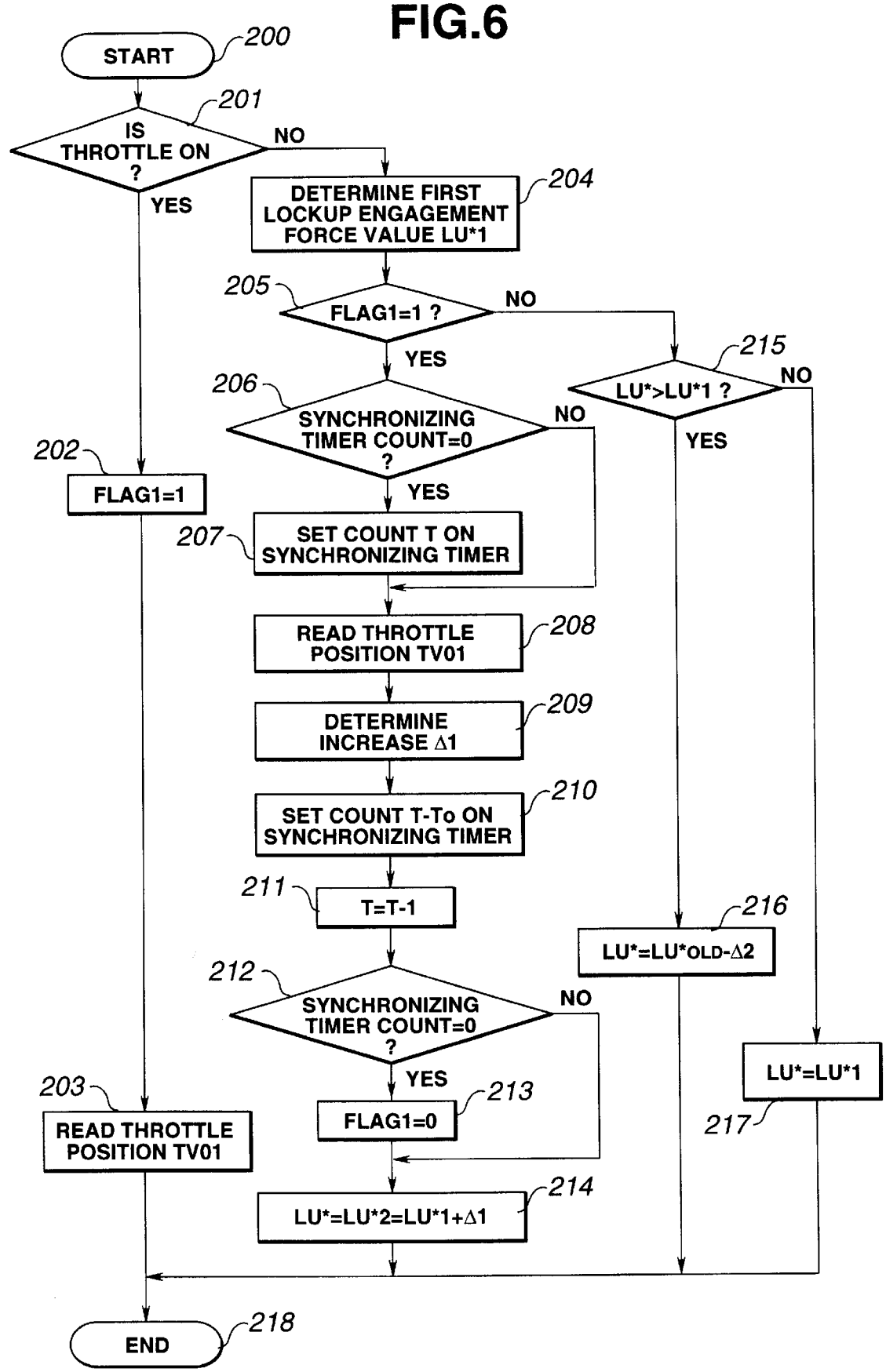
FIG. 6 is a flow diagram illustrating another modified form of the programming of the digital computer as it is used for lockup control.

FIG. 6 is a flow diagram illustrating another modified form of the programming of the digital computer as it is used for lockup control. In this embodiment, it is possible to hold the engine output positive in the interval during which the target lockup engagement force value LU* is decreased from the second value LU*2 to the first value LU*1. The computer program is entered at the point 200. At the point 201 in the program, a determination is made as to whether or not the engine throttle valve is ON (open). This determination is made based on the signal fed from the throttle position sensor. If the answer to this question is "yes", then the vehicle is accelerated and the program proceeds to the point 202 where a flag is set at 1 to indicate a change of the throttle valve from its ON position to its OFF position and then to the point 203 where the sensed value TV01 of the throttle position TV01 is used to update the last value stored in the computer memory. Consequently, the throttle position value TV01 sensed just before the throttle valve is closed is held in the computer memory. Following this, the program proceeds to the end point 218. While the answer to the question at the point 201 remains "yes", that is, during vehicle acceleration or steady condition, the last target value for the lockup engagement force under which the lockup clutch 13 is to be engaged is used so as to hold the lockup clutch 13 engaged.

If the throttle valve is OFF (closed), then it means that the vehicle is decelerated and the program proceeds from the point 201 to the point 204 where a first target value LU*1 for the lockup engagement force under which the lockup clutch 13 is to be engaged is calculated based on vehicle speed, engine speed and accessory operating conditions. At the point 205, a determination is made as to whether or not the flag has been set. If the answer to this question is "yes", then it means that the driver operates to make a change from an acceleration or steady condition to a deceleration condition and the program proceeds to the point 206. Otherwise, the program proceeds to the point 215. At the point 206, a determination is made as to whether or not the count accumulated by a synchronizing timer is zero. If the answer to this question is "yes", then the program proceeds to the point 207 where a count T is set on the synchronizing timer. The count T corresponds to the time at which the lockup engagement force reduction is initiated in synchronism with the rapid engine output drop preventive control and it is calculated based on vehicle speed, engine speed, throttle position TV01, engine coolant temperature, ATF oil temperature and the like. Otherwise, the program jump the point 207 to the point 208.

At the point 208 in the program, the throttle position TV01 stored at the point 203 is read from the computer memory. At the point 209, a value Δ1 by which the target engagement force value increases is calculated based on the read throttle position TV01. At the point 210, the count T, which corresponds to the time at which the lockup engagement force reduction is initiated in synchronism with the rapid engine output drop preventive control, is modified as T=T−To where To=Δ1/V. The character V indicates the rate at which the lockup engagement force is decreased from the second target value LU*2 to the first target value LU*1 during the interval between the times t2 and t3 (FIG. 3) to avoid undershooting according to the engine output decrease. The rate V corresponds to the interval between the times t2 and t3 (FIG. 3). The modified count T is set on the synchronizing timer. At the point 211, a command is produce to cause the synchronizing counter to count down by one step. At the point 212, a determination is made as to whether or not the count T of the synchronizing counter is zero. If the answer to this question is "yes", then the program proceeds to the point 213 where the flag is cleared to zero. Otherwise, the program jumps the point 213 to the point 214. At the point 214, a new target engagement force value LU* is calculated as LU*=LU*2=LU*1+Δ1. The calculated target engagement force value LU* is outputted for lockup engagement force control. Following this, the program proceeds to the end point 218.

At the point 215 in the program, a determination is made as to whether or not the last target lockup engagement force value LU* is greater than the first target lockup engagement force value LU*1 calculated at the point 204. The answer to this question is "yes" just after the rapid engine output drop preventive control is terminated and the program proceeds to the point 216 where a new target engagement force value LU* is calculated as LU*=LU*$_{OLD}$−Δ2 where LU*$_{OLD}$ is the last target lockup engagement force value and Δ2 is the value by which the target lockup engagement force decreases. It is to be noted that the time differentiation of the decrease Δ2 corresponds to a predetermined decreasing rate capable of preventing the lockup control fluid pressure from overshooting. The calculated target engagement force value LU* is outputted for lockup engagement force control. Following this, the program proceeds to the end point 218. The target lockup engagement force value is decreased repetitively at the point 216 so that the target lockup engagement force value LU* decreases at a predetermined rate capable of preventing the lockup control fluid pressure from overshooting until the last target lockup engagement force value LU* decreases below the first target lockup engagement force value LU*1. When the target lockup engagement force value decreases from the second value LU*2 to the first value LU*1, the program proceeds from the point 215 to the point 217 where the target lockup engagement force value LU* is calculated as LU*=LU*1. The calculated target engagement force value LU* is outputted for lockup engagement force control. Following this, the program proceeds to the end point 218.

In this embodiment, the target lockup engagement force LU* varies as indicated by the broken curve of FIG. 3. That is, this embodiment is more effective to prevent the engine from stalling than the first and second embodiments of FIGS. 2 and 5.

Figure 7:
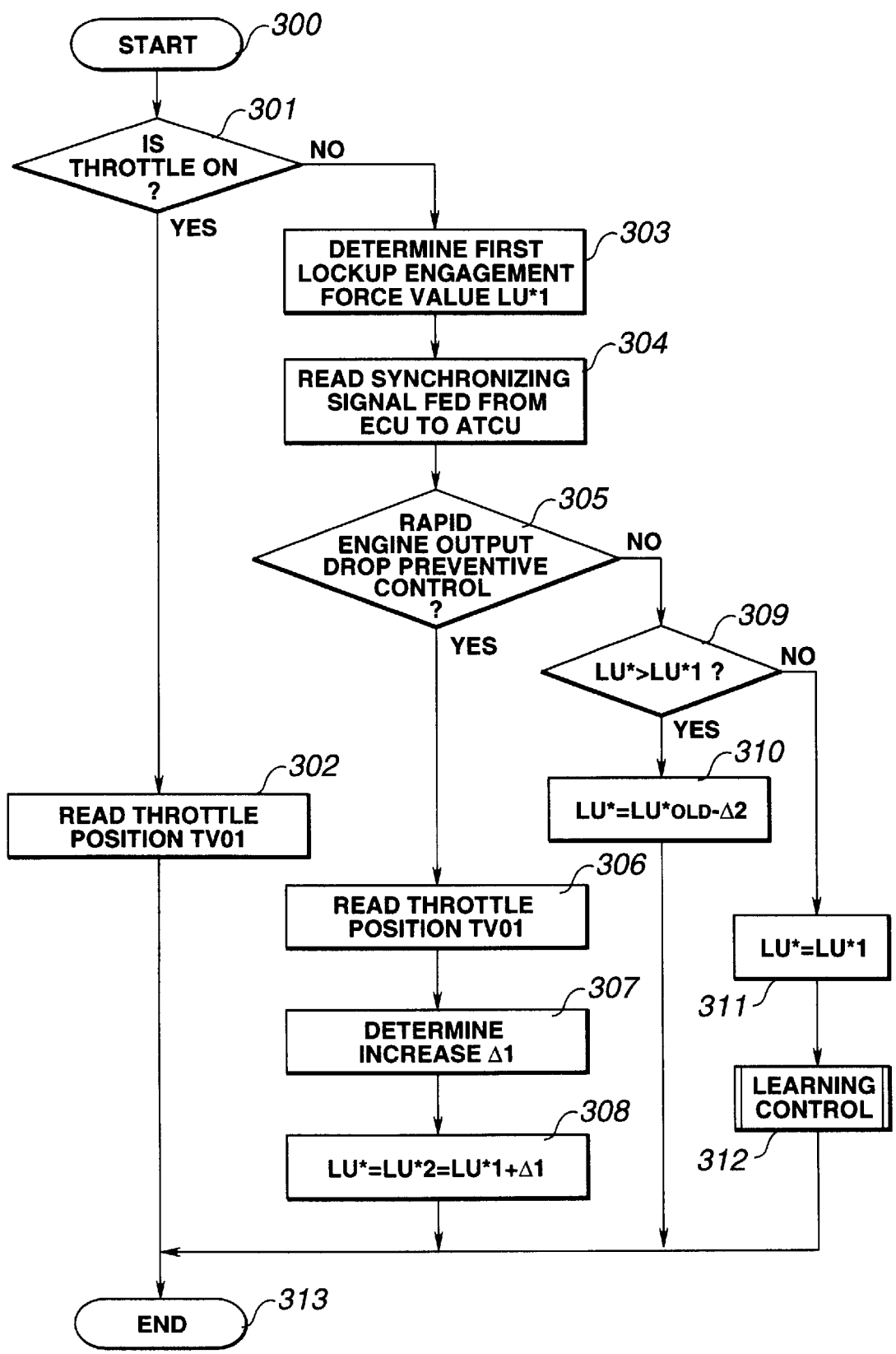
FIG. 7 is a flow diagram illustrating another modified form of the programming of the digital computer as it is used for lockup control.

FIG. 7 is a flow diagram illustrating still another modified form of the programming of the digital computer as it is used for lockup control. The computer program is entered at the point 300. At the point 301 in the program, a determination is made as to whether or not the engine throttle valve is ON (open). This determination is made based on the signal fed from the throttle position sensor. If the answer to this question is "yes", then the vehicle is accelerated and the program proceeds to the point 302 where the sensed value TV01 of the throttle position TV01 is used to update the last value stored in the computer memory. Consequently, the throttle position value TV01 sensed just before the throttle valve is closed is held in the computer memory. Following this, the program proceeds to the end point 313. While the answer to the question at the point 301 remains "yes", that is, during vehicle acceleration or steady condition, the last target value for the lockup engagement force under which the lockup clutch 13 is to be engaged is used so as to hold the lockup clutch 13 engaged.

If the throttle valve is OFF (closed), then it means that the vehicle is decelerated and the program proceeds from the point 301 to the point 303 where a first target value LU*1 for the lockup engagement force under which the lockup clutch 13 is to be engaged is calculated based on vehicle speed, engine speed and accessory operating conditions. At the point 304, the synchronizing signal transmitted from the engine control unit 20 to the automatic transmission control unit 24 is read. The read synchronizing signal is used to detect the length of time during which a rapid engine output drop preventive control is performed. At the point 305, a determination is made as to whether or not the rapid engine output drop preventive control is performed. If the answer to this question is "yes", then the program proceeds to the point 306. Otherwise, the program proceeds to the point 309.

At the point 306 in the program, the throttle position TV01 stored at the point 302 is read from the computer memory. At the point 307, a value $\Delta 1$ by which the target engagement force value increases is calculated based on the read throttle position TV01. At the point 308, a new target engagement force value LU* is calculated as LU*=LU*2=LU*1+$\Delta 1$. The calculated target engagement force value LU* is outputted for lockup engagement force control. Following this, the program proceeds to the end point 313.

If the rapid engine output drop preventive control is interrupted, then the program proceeds from the point 305 to another determination step at the point 309. This determination is as to whether or not the last target lockup engagement force value LU* is greater than the first target lockup engagement force value LU*1 calculated at the point 303. The answer to this question is "yes" just after the rapid engine output drop preventive control is terminated and the program proceeds to the point 310 where a new target engagement force value LU* is calculated as LU*= LU*$_{OLD}$-$\Delta 2$ where LU*$_{OLD}$ is the last target lockup engagement force value and $\Delta 2$ is the value by which the target lockup engagement force decreases. It is to be noted that the time differentiation of the decrease $\Delta 2$ corresponds to a predetermined decreasing rate capable of preventing the lockup control fluid pressure from overshooting. The calculated target engagement force value LU* is outputted for lockup engagement force control. Following this, the program proceeds to the end point 313. The target lockup engagement force value is decreased repetitively at the point 310 so that the target lockup engagement force value LU* decreases at a predetermined rate capable of preventing the lockup control fluid pressure from overshooting until the last target lockup engagement force value LU* decreases below the first target lockup engagement force value LU*1. When the target lockup engagement force value decreases from the second value LU*2 to the first value LU*1, the program proceeds from the point 309 to the point 311 where the target lockup engagement force value LU* is calculated as LU*= LU*1. The calculated target engagement force value LU* is outputted for lockup engagement force control. At the point 312, the learning control is performed to optimize (or minimize) the target lockup engagement force during deceleration and also optimize the minimum rate at which the target lockup engagement force is decreased to prevent the target lockup engagement force from undershooting. Following this, the program proceeds to the end point 313.

Figure 8:
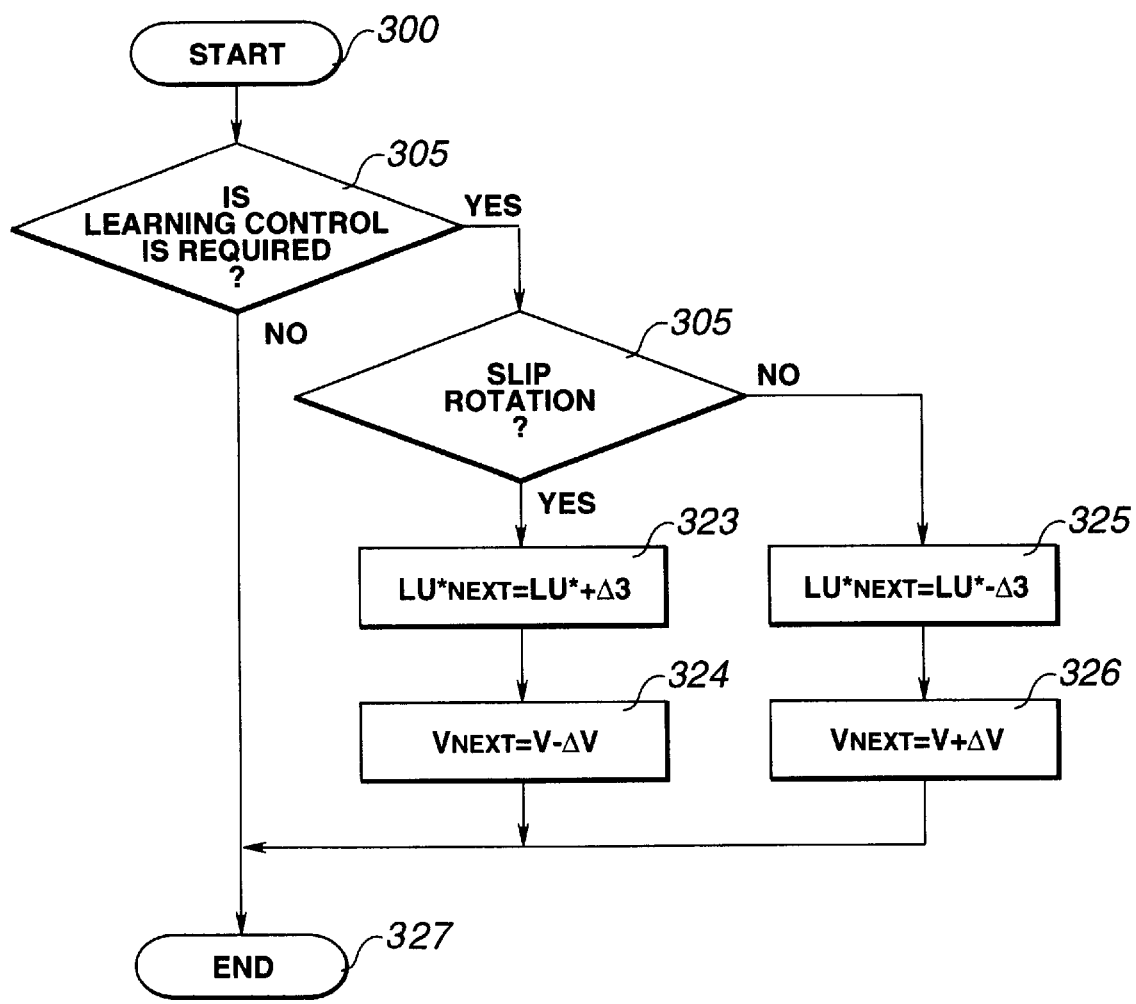
FIG. 8 is a detailed flow diagram illustrating the programming of the digital computer as it is used for the learning control.
Figure 9A:
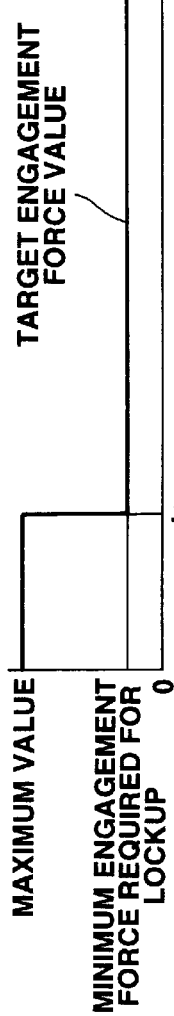
FIGS. 9A to 9D are graphs used in explaining the problems associated with the lockup control apparatus on which the invention is an improvement.
Figure 9B:
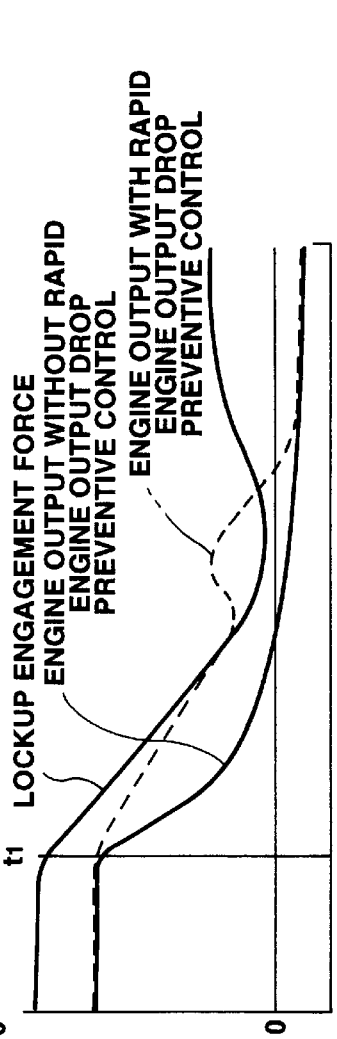
Figure 9C:
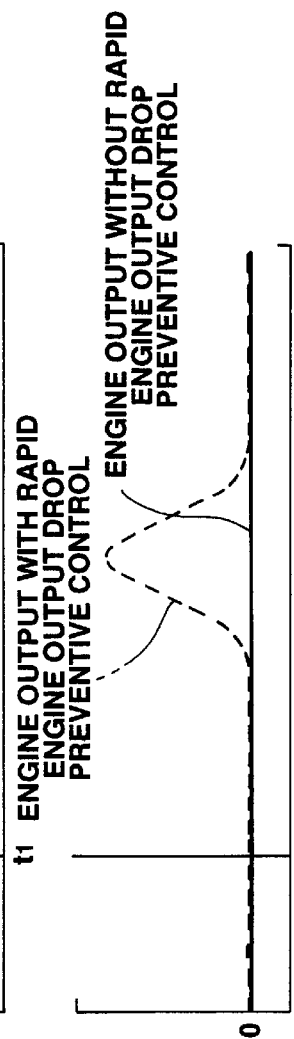
Figure 9D:
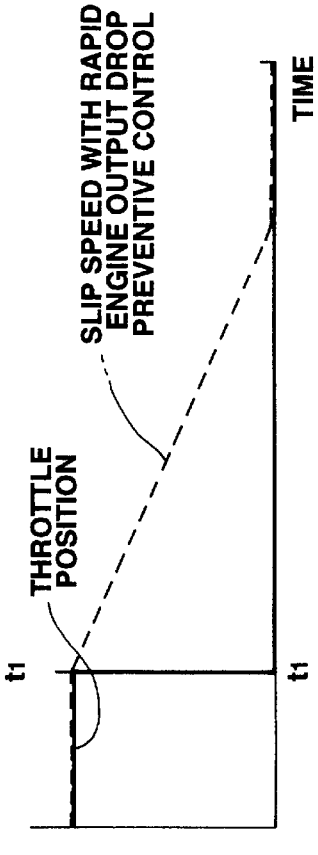

FIG. 8 is a flow diagram illustrating the programming of the digital computer as it is used for one example of learning controls performed to optimize or minimize the target lockup engagement force. The computer program is entered at the point 320 which corresponds to the point 312 of FIG. 7. At the point 321 in the program, a determination is made as to whether or not the learning control is to be performed. The learning control is performed at such a time that the target lockup engagement force value can be optimized or minimized during deceleration, for example, when the target lockup engagement force has changed from the second value LU*2 to the first value LU*1 so as to achieve the object of the lockup engagement force control. If the answer to this question is "no", then the program proceeds to the end point 327. Otherwise, the program proceeds to another determination step at the point 322. This determination is as to whether or not slip occurs in the torque converter. If the answer to this question is "yes", then it means that the lockup condition remains upon completion of the target lockup engagement force reduction control and the program proceeds to the point 323 where the next value LU*$_{NEXT}$ of the target lockup engagement force LU* is increased as LU*$_{NEXT}$=LU*+$\Delta 3$ where $\Delta 3$ is the learned increase. At the point 324, the next value V$_{NEXT}$ of the rate V (V=d$\Delta 2$/dt) at which the lockup engagement force is decreased from the second target value LU*2 to the first target value LU*1 to avoid undershooting is decreased as V$_{next}$=V-$\Delta 3$. Following this, the program proceeds to the end point 327.

If no slip is detected in the torque converter 12, then the program proceeds from the point 322 to the point 325 where the next value LU*$_{NEXT}$ of the target lockup engagement force LU* is decreased as LU*$_{NEXT}$=LU*-$\Delta 3$. At the point 326, the next value V$_{NEXT}$ of the rate V (V=d$\Delta 2$/dt) at which the lockup engagement force is decreased from the second target value LU*2 to the first target value LU*1 to avoid undershooting is increased as V$_{next}$=V+$\Delta 3$. Following this, the program proceeds to the end point 327.

In this embodiment, it is possible to converge the next value LU*$_{NEXT}$ of the target lockup engagement force LU* to its minimum value and also the next value V$_{NEXT}$ of the rate V to its minimum value.

While the invention has been described in conjunction with specified embodiments thereof, it is to be understood that the invention is not limited in any way to the illustrated embodiments. For example, an appropriate parameter, for example, throttle position or the like may be monitored to detect a change from an acceleration or steady condition to a deceleration condition. The engine output may be determined by monitoring throttle position or the like corresponding to the engine output. An appropriate parameter, for example, throttle position or the like corresponding to the engine output may be monitored to determine the interval between the time at which a change is made from an acceleration or steady condition to a deceleration and the time at which the engine output becomes negative. The engine output may be determined based on an appropriate parameter, for example, engine speed, engine intake air flow rate or the like corresponding thereto. In this case, the engine intake air flow rate may be determined based on throttle position. The parameter, which is used in the engine output control to change the engine output, may be monitored to determine the engine intake air flow rate or the termination of the interval between the time at which a change is made from an acceleration or steady condition to a deceleration and the time at which the engine output becomes negative. The rate of decrease of the target lockup engagement force may be determined at the moment at which a change is made from an acceleration or steady condition to a deceleration. The target lockup engagement force may be determined based on the lockup control fluid pressure or an appropriate parameter corresponding thereto. The next target lockup engagement force may be increased or decreased, according to whether the lockup condition is held at the termination of reduction of the target lockup engagement force from the second value to the first value, by a predetermined value to converge it to the required minimum value. Similarly, the rate of decrease of the target lockup engagement force may be increased or decreased, according to whether the lockup condition is held at the termination of reduction of the target lockup engagement force from the second value to the first value, by a predetermined value to converge it to the required minimum value. When the rate of decrease of the target lockup engagement force is increased by a predetermined value according to whether the lockup condition is held at the termination of reduction of the target lockup engagement force from the second value to the first value, the rate of decrease of the target lockup engagement force may be decreased in the next cycle of the lockup control. Similarly, when the rate of decrease of the target lockup engagement force is decreased by a predetermined value according to whether the lockup condition is held at the termination of reduction of the target lockup engagement force from the second value to the first value, the rate of decrease of the target lockup engagement force may be increased in the next cycle of the lockup control.

What is claimed is:

1. A lockup control apparatus for use with an automotive vehicle including an engine, an automatic transmission and a torque converter having a lockup clutch operable on a variable engagement force to provide a controlled degree of mechanical connection between the engine and the automatic transmission during deceleration, comprising:

means for sensing vehicle operating conditions and means for sensing engine output;

means for detecting a driver's operation to change one of acceleration and steady conditions to a deceleration condition; and control means for controlling the engagement force applied to the lockup clutch, the control means including means for calculating a first value based on the sensed vehicle operating conditions, means for calculating a second value based on the sensed engine output, means for setting the lockup engagement force at a value substantially equal to the first value plus the second value when the engine output remains in a first state after the driver's operation is detected, and means for decreasing the set lockup engagement force at a predetermined rate to the first value after the engine output achieves a second state.

2. The lockup control apparatus as claimed in claim 1, wherein the control means includes means for determining the engine output based on engine throttle valve position.

3. The lockup control apparatus as claimed in claim 1, wherein the control means includes means for performing a rapid engine output drop preventive control, means for producing an end signal when the rapid engine output drop preventive control is terminated, means responsive to the end signal for changing the lockup control operation from the first stage to the second stage.

4. The lockup control apparatus as claimed in claim 1, wherein the control means includes means for determining a time at which the lockup control operation is changed from the first stage to the second stage based on vehicle operating conditions.

5. The lockup control apparatus as claimed in claim 1, wherein the control means includes means for determining a time at which the lockup control operation is changed from the first stage to the second stage when the driver's operation is detected.

6. The lockup control apparatus as claimed in claim 1, wherein the control means includes means for calculating a time delay between a time at which the engine output becomes negative and a time at which the lockup engagement force decreases from the value substantially equal to the first value plus the second value to the first value, and means for determining a time at which the lockup control operation is changed from the first stage to the second stage based on the calculated time delay.

7. The lockup control apparatus as claimed in claim 1, wherein the control means includes means for determining the first value based on at least one of the vehicle operating conditions sensed when the driver's operation is detected.

8. The lockup control apparatus as claimed in claim 1, wherein the control means includes means for determining the second value based on the engine output according to a lockup engagement force characteristic provided before braking with respect to a minimum engine speed required to avoid engine stall during deceleration.

9. The lockup control apparatus as claimed in claim 1, wherein the control means includes means for determining the second value when the driver's operation is detected.

10. The lockup control apparatus as claimed in claim 1, wherein the control means includes means for adjusting the predetermined rate according to whether the lockup clutch remains in a lockup condition when the lockup engagement force is decreased to the first value.

11. The lockup control apparatus as claimed in claim 1, wherein the control means includes means for determining the predetermined rate when the second stage of lockup control operation is initiated.

12. The lockup control apparatus as claimed in claim 1, wherein the lockup engagement force control is applied for a change from a lockup condition under an acceleration or steady condition to a lockup condition under a deceleration condition, a change from a slip condition under an acceleration or steady condition to a lockup condition under a deceleration condition, and a change from a lockup condition under an acceleration or steady condition to a slip condition under a deceleration condition.

13. The lockup control apparatus as claimed in claim 1, wherein the control means includes means for calculating a minimum lockup engagement force required during deceleration, and means for determining the first and second values based on the calculated minimum lockup engagement force.

14. The lockup control apparatus as claimed in claim 1, wherein the means for sensing vehicle operating conditions includes vehicle speed, engine speed, or accessory operating conditions.

15. The lockup control apparatus as claimed in claim 1, wherein the first state is when the engine output is greater than zero, and the second state is when the engine output is less than zero.

16. The lockup control apparatus as claimed in claim 1, wherein the first state includes the time before $(T-T_0)$, and the second state includes the time after $(T-T_0)$, where T is equal to the time at which the lockup engine force reduction is initiated, and $T_0$ is equal to $\Delta 1/V$, where $\Delta 1$ is equal to the second value, and V is equal to the predetermined rate.

* * * * *